Feb. 9, 1926.
S. J. NORDSTROM
VALVE
Filed Dec. 14, 1923
1,572,030
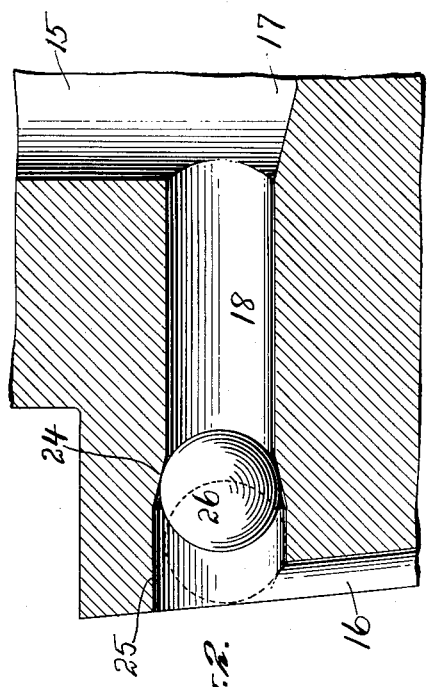
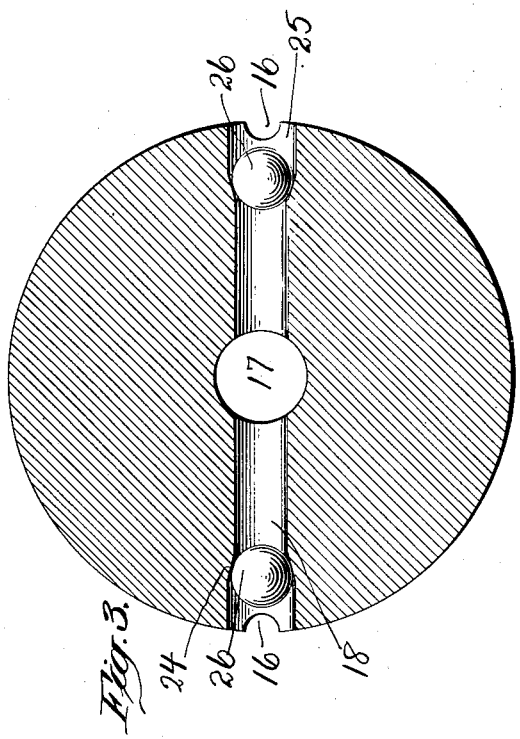
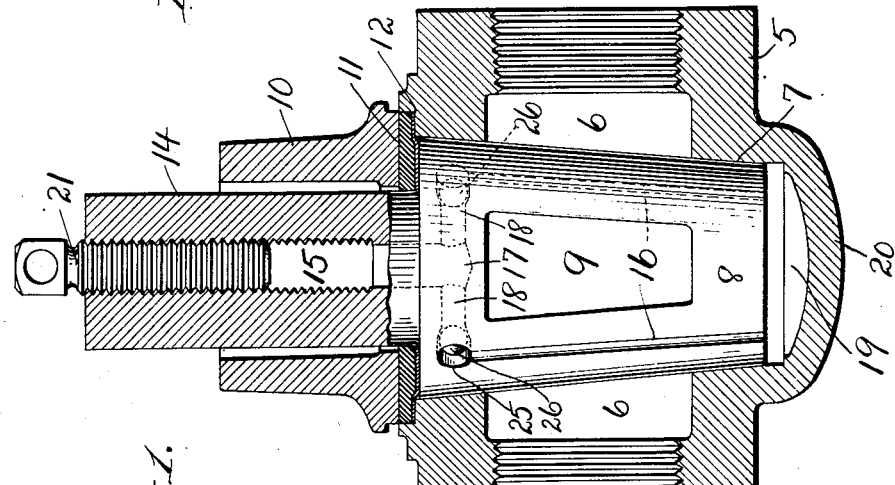
INVENTOR
Sven Johan Nordstrom
BY Archibald Cox
his ATTORNEY Patented Feb. 9, 1926.

1,572,030

UNITED STATES PATENT OFFICE.

SVEN JOHAN NORDSTROM, OF SAN FRANCISCO, CALIFORNIA, ASSIGNOR, BY DIRECT AND MESNE ASSIGNMENTS, TO MERCO NORDSTROM VALVE COMPANY, OF SAN FRANCISCO, CALIFORNIA, A CORPORATION OF DELAWARE.

VALVE.

Application filed December 14, 1923. Serial No. 680,594.

*To all whom it may concern:*

Be it known that I, SVEN JOHAN NORDSTROM, a subject of the King of Sweden, and a resident of San Francisco, in the county of San Francisco and State of California, have invented certain new and useful Improvements in Valves, of which the following is a specification.

The invention relates to an improvement in valves and more particularly to an improvement in valves of the type disclosed in my Reissue Patent, No. 14,516, reissued August 27, 1918.

The valve shown in said reissue patent comprises a casing having a tapered valve seat and a tapered plug seated in the valve seat. In the seating surface of the plug are two oppositely disposed lubricating grooves which communicate with a hole in the plug stem which serves as a lubricant reservoir by means of a transverse hole or duct in the plug. The outer end of the hole in the stem is threaded to receive a compression screw by which the lubricant is put under pressure and forced into the lubricating grooves and also into a chamber under the plug. If the lubricant is put under sufficient pressure, the plug is lifted from its seat, even when it is stuck or frozen thereto. Stops are provided to limit the angle through which the plug may be turned so as to prevent the lubricating grooves from being exposed to the fluid passing through the line.

It has been found that when such a valve is used in high pressure service and the compression screw is removed to permit the reservoir to be refilled with lubricant, the fluid in the pipe line will be forced between the seating surfaces on the pressure side of the plug and so force the lubricant in the chamber and in the lubricating grooves out through the reservoir. The object of the present invention is to provide means for preventing this back flow of lubricant while at the same time permitting the lubricant in the reservoir to be forced into the lubricating grooves and into the chamber. To this end, the invention consists in the improved valve more fully described hereinafter and particularly pointed out in the appended claims.

In the accompanying drawings illustrating the preferred form of the invention, Fig. 1 is a vertical section taken longitudinally through the improved valve; Fig. 2 is a section, on an enlarged scale, of one of the check valves; and Fig. 3 is a transverse section through the plug, showing the check valves in position.

The improved valve of the present invention comprises a casing and a tapered plug seated in the casing. In the seating surface between the plug and the casing is formed a lubricating groove or grooves by which the seating surfaces may be lubricated. The lubricating grooves communicate with a reservoir for containing lubricant which is put under pressure to force it into the lubricating grooves. Between the groove or grooves and the pressure means is located an improved check valve or check valves for preventing back flow of lubricant from the groove or grooves into and out through the reservoir.

More specifically, the improved valve in the form of embodiment shown in the drawings, comprises a valve casing 5 having a passageway 6 therethrough and a tapered hole 7 in which is seated a tapered plug 8 having a hole 9 therein adapted to register with the passageway 6 when the plug is turned to open position. The contacting surfaces of the plug and the tapered hole in the casing constitute the seating surfaces of the plug and casing or valve seat. The plug is held against its seat by means of a cap or gland 10 secured to the casing in the usual manner. A resilient washer 11 and a metal washer 12 are interposed between the lower end of the cap and the upper or large end of the plug.

The valve stem 14 which projects outwardly or upwardly from the large end of the plug through the cap 10 and by which the plug is turned, is provided axially with a hole 15 which serves as a reservoir to contain lubricant. Arranged longitudinally in the seating surface of the plug are a pair of oppositely disposed lubricating grooves 16 which communicate at their upper ends with the lower end 17 of the reservoir 15 by means of the transverse hole or duct 18. The lower ends of the lubricating grooves 16 communicate with a chamber 19 located between the lower or small end of the plug and the adjacent part 20 of the valve casing. The grooves 16 are so arranged that they are never directly exposed to the fluid passing through the valve. The grooves are thus in effective communication with the chamber 19 whether the plug is in open or closed position.

The lubricant in the reservoir 15 is put under pressure so as to be forced down through the grooves 16 and into the chamber 19. By putting the lubricant under sufficient pressure the plug is lifted from its seat and when the plug is turned the seating surface between the plug and casing is thus effectively lubricated. Also if the plug happens to be stuck or frozen to its seat, it may be freed in the same manner. The lubricant in the reservoir is put under pressure by means of a compression screw 21 which is received in the upper or outer threaded end of the reservoir 15. It will be understood that the reservoir and the lubricating grooves are shown in their preferred arrangement, but that for the purpose of the invention they may be otherwise located and arranged.

In a valve constructed as described above, if the compression screw 21 is removed for any purpose, as to supply the reservoir with fresh lubricant, there will be a back flow of lubricant from the chamber 19 through the grooves 16 and out through the reservoir. This will occur whether the plug is in open or closed position. If the valve is located in a high pressure line and the compression screw is removed, the pressure in the line will force the lubricant out through the reservoir with great rapidity and so with danger to the workman. In order to prevent this back flow of lubricant from the chamber 19 and the lubricating grooves through the reservoir when the screw 21 is removed, each outer end of the transverse hole 18 is provided with a check valve which is so constructed and arranged that it unseats under the pressure of the lubricant put on it by the compression screw and seats under the back pressure put on the lubricant by the fluid passing through the line. The valve housing 25 of each check valve is formed by boring into each outer end of the transverse hole 18. The point of junction 24 between the housing 25 and the transverse hole 18 constitutes the valve seat against which the ball 26 is adapted to be seated when the lubricant in the adjacent groove is put under back pressure by the fluid passing through the line. The ball valve 26 is somewhat larger than the hole 18 and somewhat smaller than the housing 25. The ball is thus permitted to move freely in the housing and yet sufficient material is provided for a tight seating of the ball against the seat. The taper of the valve seat 24 is such as to assure the tightest possible engagement between the ball and seat without binding or sticking.

Inasmuch as the check valves open outwardly and consist of balls loosely contained in the housings 25, ample space is provided for the passageway of lubricant under pressure from the reservoir 15 into the lubricating grooves 16 and into the chamber 19. When the compression screw 21 is removed, the back pressure of the lubricant in the grooves against the balls will seat them tightly against the valve seats 24 and thus effectively prevent any back passage of lubricant up into the reservoir from the lubricating grooves and the chamber 19.

Having thus described the invention what I claim as new is:—

1. A valve comprising a casing, a plug seated in the casing provided with a pair of oppositely disposed lubricating grooves, the stem of the plug being provided with a reservoir for lubricant, the stem end of the tapered portion of the plug having a transverse hole connecting the lower end of the reservoir with the upper ends of the lubricating grooves, a screw in the outer end of the stem for putting the lubricant in the reservoir under pressure to force it into the grooves, and an outwardly opening check valve located in each outer end of the transverse hole in the plug permitting flow of lubricant from the reservoir into the grooves, but preventing back flow of lubricant from the grooves into the reservoir.

2. A valve comprising a casing, a plug seated in the casing, the seating surface between the plug and casing being provided with a lubricating groove, a reservoir connected with one end of the groove by a transverse hole in the plug, means for putting the lubricant in the reservoir under pressure to force it into the groove and a check valve located adjacent to the seating surface of the plug permitting flow of lubricant from the reservoir into the groove and preventing back flow of lubricant from the groove into the reservoir.

3. A valve comprising a casing, a plug seated in the casing provided with vertically arranged oppositely disposed lubricating grooves, a reservoir for lubricant in the stem of the plug, the upper or larger end of the tapered part of the plug being provided with a transverse hole connecting the lower end of the reservoir with the upper ends of the lubricating grooves, means for putting the lubricant in the reservoir under pressure to force it into the grooves, each outer end of the transverse hole being enlarged to form a valve seat and a ball in each enlargement of the transverse hole adapted to seat against the valve seat when subjected to back pressure from the lubricant in the grooves to prevent back flow of lubricant from the grooves to the reservoir, said balls being arranged to permit flow of lubricant from the reservoir into the grooves.

4. A valve comprising a casing, a plug seated in the casing, a reservoir for lubricant formed in the plug, the seating surface between the plug and the casing being provided with a lubricating groove, said plug being provided with a duct connecting the reservoir with the groove, means for putting the lubricant in the reservoir under pressure to force it into the groove, and a check valve adapted to seat against a valve seat formed in the plug to prevent back flow of lubricant from the groove into the reservoir, said check valve being arranged to permit flow of lubricant from the reservoir into the groove.

SVEN JOHAN NORDSTROM.